(12) United States Patent
Sun

(10) Patent No.: US 9,459,976 B1
(45) Date of Patent: Oct. 4, 2016

(54) REPAIR OF COMPUTERS THAT HAVE SOFTWARE-RELATED PROBLEMS

(75) Inventor: Chih-Yao Sun, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1359 days.

(21) Appl. No.: 12/970,015

(22) Filed: Dec. 16, 2010

(51) Int. Cl.
*G06F 11/00* (2006.01)
*G06F 11/22* (2006.01)

(52) U.S. Cl.
CPC .................. *G06F 11/2294* (2013.01)

(58) Field of Classification Search
USPC .............................. 714/4.4, 26, 27
See application file for complete search history.

(56) References Cited

U.S. PATENT DOCUMENTS

| | | | |
|---|---|---|---|
| 6,170,065 B1 * | 1/2001 | Kobata et al. | 714/38.14 |
| 6,813,733 B1 * | 11/2004 | Li et al. | 714/47.3 |
| 7,325,170 B2 * | 1/2008 | Srinivasan et al. | 714/46 |
| 2003/0135592 A1 * | 7/2003 | Vetter et al. | 709/220 |
| 2006/0107119 A1 * | 5/2006 | Miller et al. | 714/36 |
| 2006/0259809 A1 * | 11/2006 | Mishra et al. | 714/4 |
| 2010/0257346 A1 | 10/2010 | Sosnosky et al. | |
| 2011/0060945 A1 * | 3/2011 | Leprince et al. | 714/25 |
| 2011/0107137 A1 * | 5/2011 | Lam et al. | 714/4.4 |

OTHER PUBLICATIONS

Advanced Configuration and Power Interface—Wikipedia, the free encyclopedia, 5 sheets [retrieved on 12/03/201], retrieved from the internet: http://en.wikipedia.org/wiki/Advanced_Configuration_and_Power_Interface.
What Is a Multimedia Kiosk? Ads by Google, 3 sheets [retrieved on Dec. 9, 2010], retrieved from the internet: http://www.wisegeek.com/what-is-a-multimedia-kiosk.htm.
Kiosk webpage [online], 3 sheets (retrieved on Dec. 9, 2010], retrieved from the internet: http://www.kiosk.com.
IPTV—Wikipedia, the free encyclopedia, 16 sheets [retrieved on Dec. 9, 2010], retrieved from the internet: http://en.wikipedia.org/wiki/IPTV.

* cited by examiner

*Primary Examiner* — Marc Duncan
(74) *Attorney, Agent, or Firm* — Okamoto & Benedicto LLP

(57) ABSTRACT

A computer system includes a system healing module for facilitating repair of a malfunctioning computer. The system healing module may be a set-top box for cable television or a publicly accessible kiosk, for example. The system healing module collects diagnostic data from a malfunctioning computer and provides the diagnostic data to a system healing harvester. The system healing harvester provides the diagnostic data to a system healing master that analyzes the diagnostic data to determine a support server that is responsible for fixing a problem indicated in the diagnostic data. Based on the diagnostic data, the support server generates remediation data, which is received in the system healing module by way of the system healing master and the system healing harvester. The system healing module uses the remediation data to fix the malfunctioning computer.

12 Claims, 5 Drawing Sheets

REPAIR OF COMPUTERS THAT HAVE SOFTWARE-RELATED PROBLEMS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to computer security, and more particularly but not exclusively to methods and apparatus for diagnosis and repair of computers.

2. Description of the Background Art

Computers are employed not just for work but also for personal use. While organizations may have dedicated staff for repairing malfunctioning computers, individual users typically have to fix computers on their own. Therein lies the problem because computers have become so complicated that their repair is beyond the capability of most users.

Computer malfunctions may be hardware or software related. Software-related problems are commonplace because users continually install new software in their computers. Exacerbating this problem is the numerous updates released by software vendors. Examples of these updates include computer virus signature updates employed by antivirus programs, and updates to the operating system and application software to correct bugs, add features, or address a security issue. An improperly installed or defective update may result in corrupted or deleted files that make the computer unstable. Files may also be corrupted by malfunctioning hardware or unexpected environmental events, such as inadvertent power downs or power glitches.

Software vendors do their best to provide user-friendly recovery procedures. Unfortunately, some users, especially home users, do not have adequate computer knowledge to perform even relatively simple recovery procedures. Other software vendors provide restore CD/DVD media for restoring a computer to its initial state, i.e., as purchased by the user. These restore media are not only difficult to use, but also become obsolete as soon as the vendor releases new updates. Other recovery procedures overwrite the whole system that may remove important data linkages. While an advanced user may be able to fix broken or lost data linkages, most users will have great difficulty doing so.

SUMMARY

In one embodiment, a computer system includes a system healing module for facilitating repair of a malfunctioning computer. The system healing module may be a set-top box for cable television or a publicly accessible kiosk, for example. The system healing module collects diagnostic data from a malfunctioning computer and provides the diagnostic data to a system healing harvester. The system healing harvester provides the diagnostic data to a system healing master that analyzes the diagnostic data to determine a support server that is responsible for fixing a problem indicated in the diagnostic data. Based on the diagnostic data, the support server generates remediation data, which is received in the system healing module by way of the system healing master and the system healing harvester. The system healing module uses the remediation data to fix the malfunctioning computer.

These and other features of the present invention will be readily apparent to persons of ordinary skill in the art upon reading the entirety of this disclosure, which includes the accompanying drawings and claims.

DESCRIPTION OF THE DRAWINGS

FIG. 4, which comprises

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
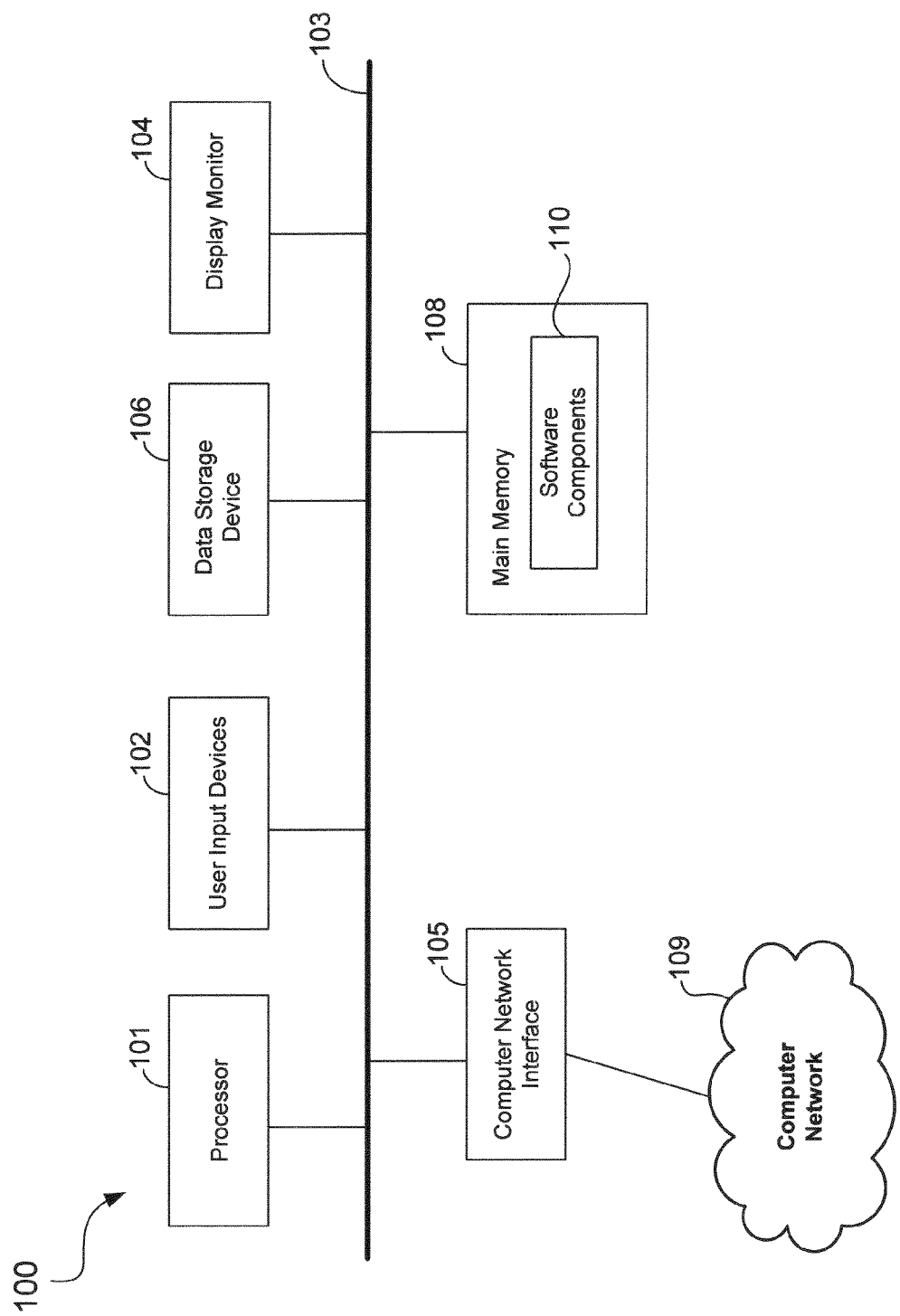
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a system healing module, system healing harvester, system healing master, vendor server, and other computers described below. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software components 108. The software components 108 comprise computer-readable program code stored non-transitory in the main memory 108 for execution by the processor 101. The software components 110 may be loaded from the data storage device 106 to the main memory 108. The software components 108 may also be made available in other computer-readable medium including optical disk, flash drive, and other memory device.

Figure 2:
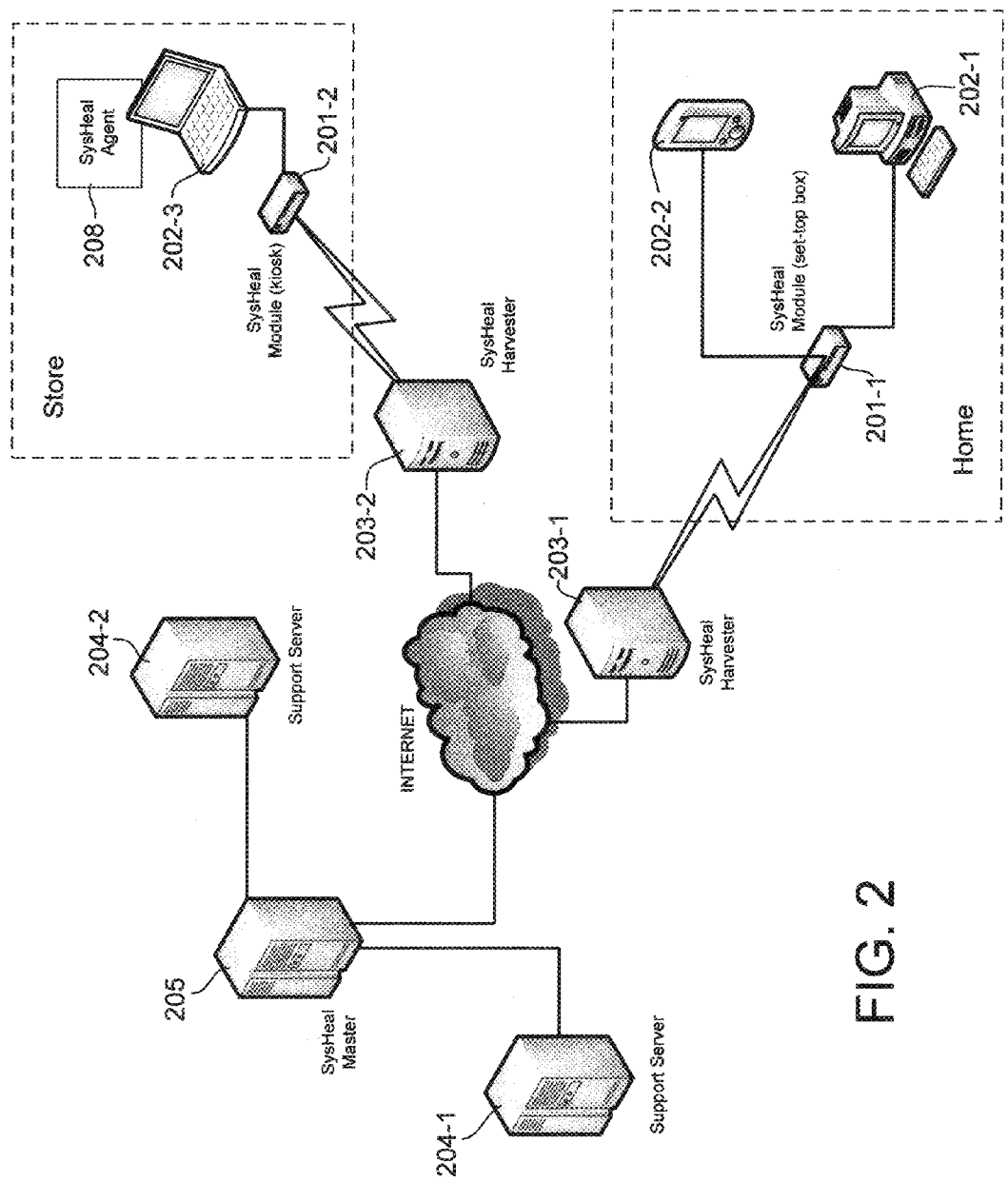
FIG. 2 schematically shows a computer system in accordance with an embodiment of the present invention.

FIG. 2 schematically shows a computer system in accordance with an embodiment of the present invention. In the example of FIG. 2, the computer system includes system healing ("SysHeal") modules 201 (i.e., 201-1, 201-2, . . . ), system healing harvesters 203 (i.e., 203-1, 203-2, . . . ), a system healing master 205, and support servers 204 (i.e., 204-1, 204-2, . . . ). The computer system of FIG. 2 is configured for diagnosing and repairing computers 202 (i.e., 202-1, 202-2, 202-3, . . . ) that are malfunctioning because of corrupted, deleted, and/or improperly configured software components or other software-related problems.

A system healing module 201 comprises an apparatus for facilitating remote diagnosis and repair of a computer 202 that has a software-related problem. For example, the computer 202 may have been updated with a defective file comprising signatures of computer viruses employed by an antivirus program. Because of the defective file, the computer 202 may have become unstable (e.g., freezes or reboots when the antivirus runs) or some of its features may have become inoperable. Typically, but not necessarily, a computer 202 is employed for personal use, such as home computers. The computer 202 may comprise a laptop computer, a desktop computer, or other computing device.

In one embodiment, a system healing module 201 is a special purpose computer coupled to a high-speed (download data rate of at least 4 MBps) network connection. In the example of FIG. 2, the system healing module 201-1 is a set-top box for cable television. The set-top box is coupled to a cable network for delivering cable television content, including movies on demand and other multimedia content. The use of a set-top box has many advantages, including high-speed network connection and availability in homes subscribing to cable television. A computer 202 may be connected to the system healing module 201-1 to diagnose and repair software-related problems. This is especially useful to home computer users as they have access to computer diagnosis and repair resources using a set-top box they already have and use. The diagnosis and repair service may thus be provided by a cable television company in conjunction with a software vendor. For example, the repair and diagnosis service may be provided by a security software vendor, such as the assignee of the present application, to customers subscribing to cable television.

A system healing module 201 may also be a kiosk or other publicly-accessible apparatus. In the example of FIG. 2, the system healing module 201-2 is a kiosk that functions as a self-serve station for repairing computers 202 that have software-related problems. The system healing module 201-2 has a high-speed network connection, which would be cost-prohibitive to most individual users. However, in this configuration, the cost of having a high-speed network connection is spread among many different individual customers that need their computers 202 repaired.

A system healing module 201 is configured to collect diagnostic data from a computer 202 and to execute remediation tasks for fixing the computer 202. In one embodiment, the diagnostic data comprises system attributes, such as file attributes, configuration information, and other information for determining what is wrong with the computer 202. In the example of FIG. 2, a system healing module 201 is configured to provide collected diagnostic data to a corresponding system healing harvester 203, and to receive remediation data from the system healing harvester 203. The remediation data may comprise files, procedures, scripts, and other information that the system healing module 201 may use to fix the computer 202. The remediation data may be originated by back-end server computers, such as the support servers 204, and forwarded to the system healing module 201 by way of the system healing master 205 and corresponding system healing harvester 203.

A system healing harvester 203 comprises an apparatus for facilitating data transfer between a system healing module 201 and other computers. In the example of FIG. 2, the system healing harvester 203 comprises a server computer configured to forward diagnostic data from the system healing module 201 to the system healing master 205, and to forward remediation data from the system healing master 205 to the system healing module 201. The system healing harvester 203 may be owned and maintained by an Internet service provider (ISP), multimedia streaming provider, cable television provider, or multimedia kiosk operator. The system healing harvester 203 may be implemented by adding functionality to an existing multimedia streaming server computer, IPTV server computer, multimedia kiosk server computer, and cable television equipment, for example.

A system healing master 205 serves as a dispatcher. A system healing master 205 comprises an apparatus for forwarding diagnostic data to the appropriate support server 204, and for forwarding responsive remediation data to corresponding system healing harvester 203. In the example of FIG. 2, the system healing master 205 comprises a server computer configured to analyze diagnostic data received from a system healing harvester 203 to determine which support server 204 has remediation data for fixing the problem of the computer 202. The system healing master 205 is configured to forward the diagnostic data to the appropriate support server 204 responsible for fixing the problem of the computer 202, to receive responsive remediation data from the support server 204, and to forward the remediation data to the system healing harvester 203 that provided the diagnostic data. The system healing master 205 may also provide other services, such as providing an antivirus package.

A support server 204 comprises an apparatus for providing remediation data for fixing a problem in a computer 202. In the example of FIG. 2, a support server 204 comprises a server computer configured to analyze diagnostic data received from the system healing master 205, to create a remediation plan to address one or more software-related problems indicated in the diagnostic data, and to generate remediation data that may be employed to fix the indicated problems. The remediation data may comprise files, scripts, and other information for addressing software-related problems in the computer 202. The support server computer 204 is typically, but not necessarily, operated and maintained by the vendor of the software that may have caused a problem in the computer 202.

In the example of FIG. 2, the support servers 204, system healing master 205, and the system healing harvesters 203 communicate over the Internet. The system healing modules 201 may communicate with corresponding system healing harvesters 203 over a proprietary (i.e., nonpublic) high-speed network connection.

In an example operation, a computer 202 that has a defective or corrupted file is connected by the user to a first apparatus in the form of a system healing module 201. The system healing module 201 may include a port, such as a universal serial bus (USB), IEEE 1394, parallel port, network interface, and other hardware communication port. The user may connect the computer 202 to the port of the system healing module 201. The system healing module 201 detects that the computer 202 has been plugged into its port and, in response, initiates collection of diagnostic data from the computer 202. The diagnostic data may comprise file attributes (e.g., version, release date, vendor, and other information for identifying the particular file), hardware attributes (e.g., installed processor, memory, video card), operating system, configuration information (e.g., registry), and other information identifying the hardware and/or software configuration of the computer 202.

The system healing module 201 may collect the diagnostic data by reading the diagnostic data or information indicative of the diagnostic data directly from the computer 202. Depending on implementation particulars, the system healing module 201 may also inject a system healing agent 208 into the computer 202. The system healing agent 208 runs in the computer 202 to collect the diagnostic data. The system healing agent 208 may comprise computer-readable program code configured to collect or generate diagnostic data of the computer 202, to provide the diagnostic data to the system healing module 201, to receive remediation data from the healing module 201, and use the remediation data to correct problems in the computer 202. The system healing agent 208 may be implemented as a Windows Operating System™ service or a Linux operating system daemon, for example.

Continuing with the example operation, the system healing module 201 forwards the diagnostic data over a high-speed network connection to a second apparatus in the form of a system healing harvester 203. The system healing harvester 203 then forwards the diagnostic data to a third apparatus in the form of a system healing master 205, which analyzes the diagnostic data to determine a fourth apparatus in the form of a support server 204 responsible for the possible problem in the computer 202. The system healing master 205 forwards the diagnostic data to one or more support servers 204 that may have remediation data (e.g., updated files for replacing known defective files) addressing a problem indicated by the diagnostic data. The responsible support server 204 receives the diagnostic data from the system healing master 205, and generates remediation data addressing one or more problems indicated in the diagnostic data. The system healing master 205 receives remediation data from one or more support servers 204, and provides the remediation data (or a compilation of all received remediation data within a period of time) to the system healing harvester 203 that provided the corresponding diagnostic data. The system healing harvester 203 forwards the remediation data to the system healing module 201 that collected the diagnostic data. The system healing module 201 uses the remediation data to address problems in the computer 202. For example, the system healing module 201, directly or by way of the system healing agent 208, replaces a defective file in the computer 202 with an updated file included in the remediation data.

Figure 3:
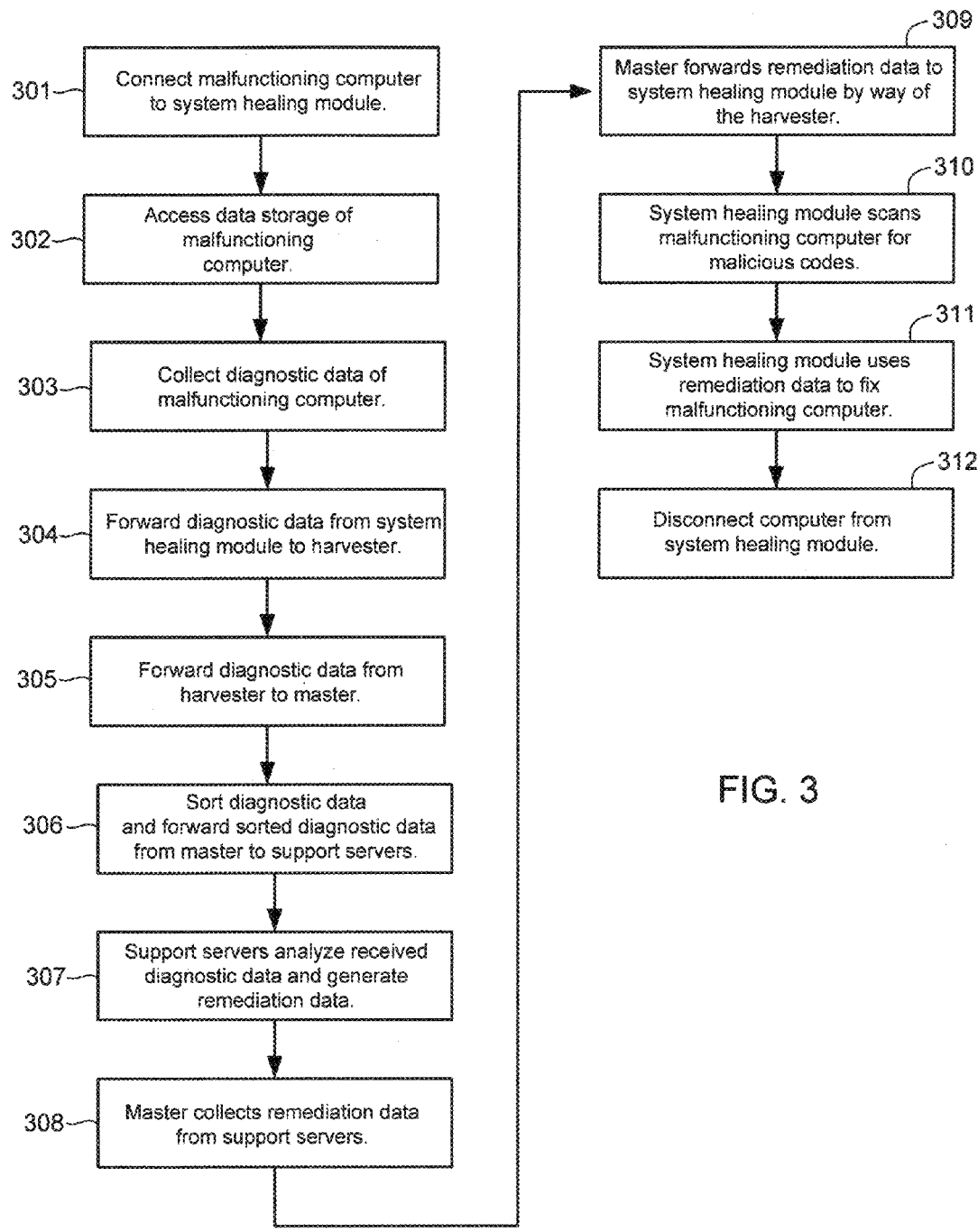
FIG. 3 shows a flow diagram of a method of repairing a computer in accordance with an embodiment of the present invention.

FIG. 3 shows a flow diagram of a method of repairing a malfunctioning computer 202 in accordance with an embodiment of the present invention. In the example of FIG. 3, the computer 202 being repaired, also referred to as "malfunctioning computer," has one or more file-level damages. Example file-level damages include a missing file, defective file, and corrupted file. The computer 202 may be in a power state that leaves components powered ON so that the computer 202 can "wake up" as needed, e.g., when a device is connected to its port. For example, the computer 202 may be in the soft off state, which is defined as the power state G2 in the Advanced Configuration and Power Interface (ACPI) specification.

In the method of FIG. 3, the malfunctioning computer 202 is connected to a port of a system healing module 201 (step 301). The system healing module 201 detects the presence of the computer 202 and, in response, accesses data storage of the computer 202 (step 302). The system healing module 201 may access the data storage of the computer 202 using any suitable means without detracting from the merits of the present invention, including by mounting the data storage device, etc. The system healing module 201 collects diagnostic data from the computer 202 (step 303). The diagnostic data collected by the system healing module 201 may include file structure information, directory lists, file message digest (MD5, SHA1 or SHA256), and file properties (e.g., digital signature, version, size). Software vendors may provide file information (e.g., how to identify their files, what diagnostic information the software vendors need) for their respective software products. The system healing module 201 may use software vendor information to gather file attributes of files in the computer 202.

The computer 202 may be diagnosed and repaired for a particular problem or an unknown problem. For example, if the software-related problem is known, such as when the problem started with installation, update, or configuration of particular problem, the particular software may be identified by the user to the system healing module 201. In that case, the system healing module 201 may collect diagnostic data only for the identified software, or provide a menu selection from which the user can identify a particular problem. In cases where the user identifies a particular problem and the system healing module 201 has stored or cached responsive remediation data for the particular problem, the system healing module can proceed with using the remediation data to fix the particular problem.

The system healing module 201 forwards the diagnostic data to the system healing harvester 203 (step 304), which in turn forwards the diagnostic data to the system healing master 205 (step 305). The system healing master 205 analyzes the diagnostic data to identify one or more support servers 204 responsible for fixing problems indicated in the diagnostic data. The system healing master 205 sorts the diagnostic data by support server 204 and forwards sorted diagnostic data to the responsible support servers 204 (step 306).

Each responsible support server 204 receives and analyzes diagnostic data to generate remediation data (step 307). The remediation data may comprise replacement files, scripts and procedures, and other data or information for fixing problems indicated in the diagnostic data. For example, the diagnostic data may indicate that the malfunctioning computer 202 includes a known defective version or incorrect version of a file (e.g., svchost.exe on Windows XP™ operating system SP3). As another example, the diagnostic data may indicate that a critical file is corrupted based on its file attributes. In that case, the remediation data may include a replacement file and a script for finding and replacing the defective or corrupted file in the computer 202. The support server 204 forwards the remediation data to the system healing master 205, which collects and compiles remediation data received from support servers 204 (step 308). The system healing master 205 forwards the remediation data to the system healing harvester 203 that relayed the corresponding diagnostic data, which in turn forwards the remediation data to the system healing module 201 that collected the diagnostic data (step 309).

The system healing module 201 may receive appropriate antivirus from the system healing master 205 by way of the system healing harvester 203. As a precautionary measure, the system healing module 201 may use the antivirus to scan the computer 202 for malicious codes (e.g., computer viruses, spyware, robots) prior to using the remediation data to fix the computer 202 (step 310).

The system healing module 201 employs the remediation data to fix the computer 202 (step 311). For example, the system healing module 201 may replace a file with the correct version of the file. The system healing module may also deploy a new file (e.g., new virus definition or pattern file) or remove existing files (e.g., defective data or pattern files). The system healing module 201 may deploy a script in the computer 202. When the computer 202 is restarted after disconnection from the system healing module 201, the script will automatically execute to perform the file replacement, addition, or removal. The script, additional, or replacement file may be included in the remediation data. The computer 202 is restarted after disconnection from the system healing module 201 (step 312).

Figure 4A:
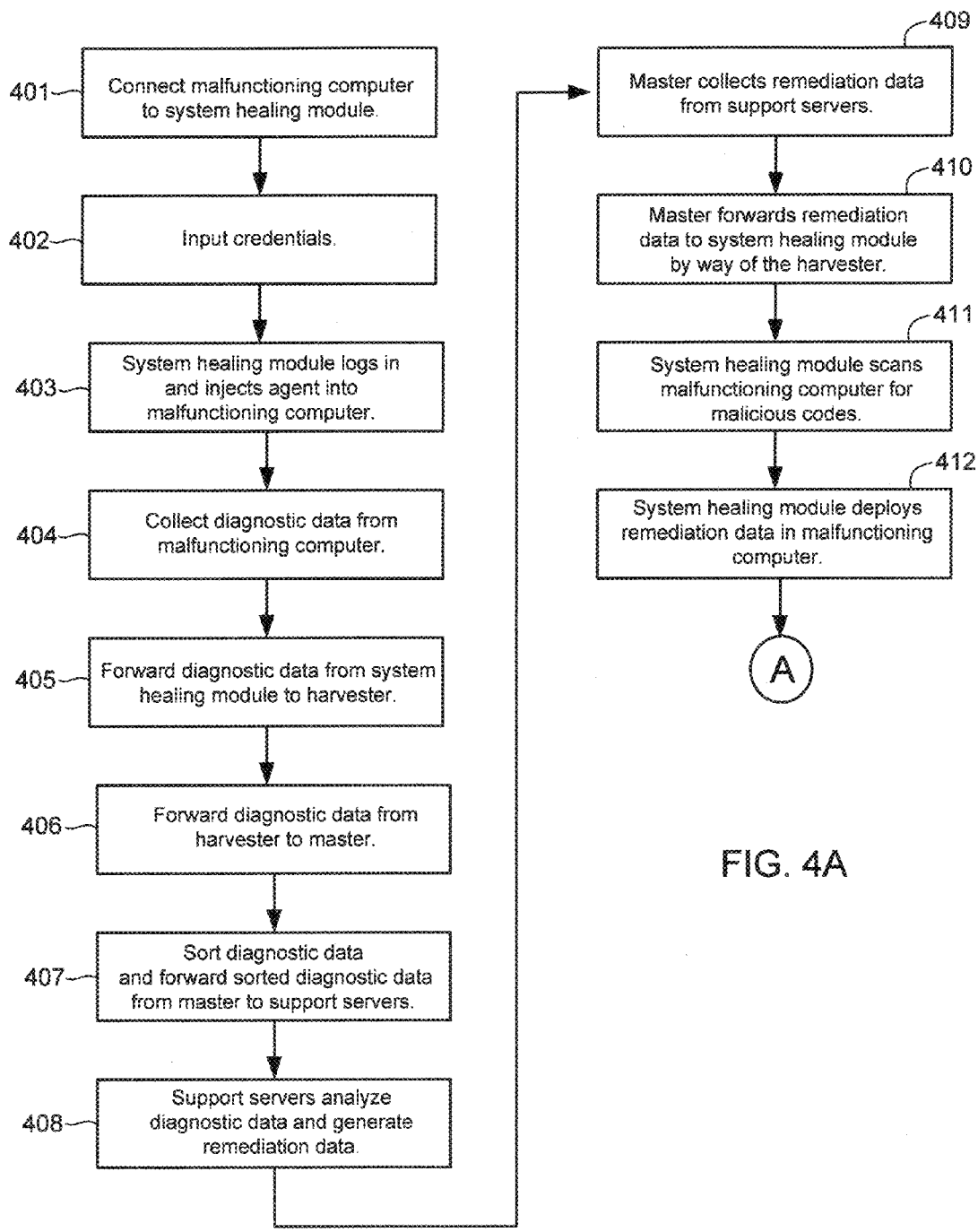
FIGS. 4A and 4B, shows a flow diagram of a method of repairing a computer in accordance with another embodiment of the present invention.
Figure 4B:
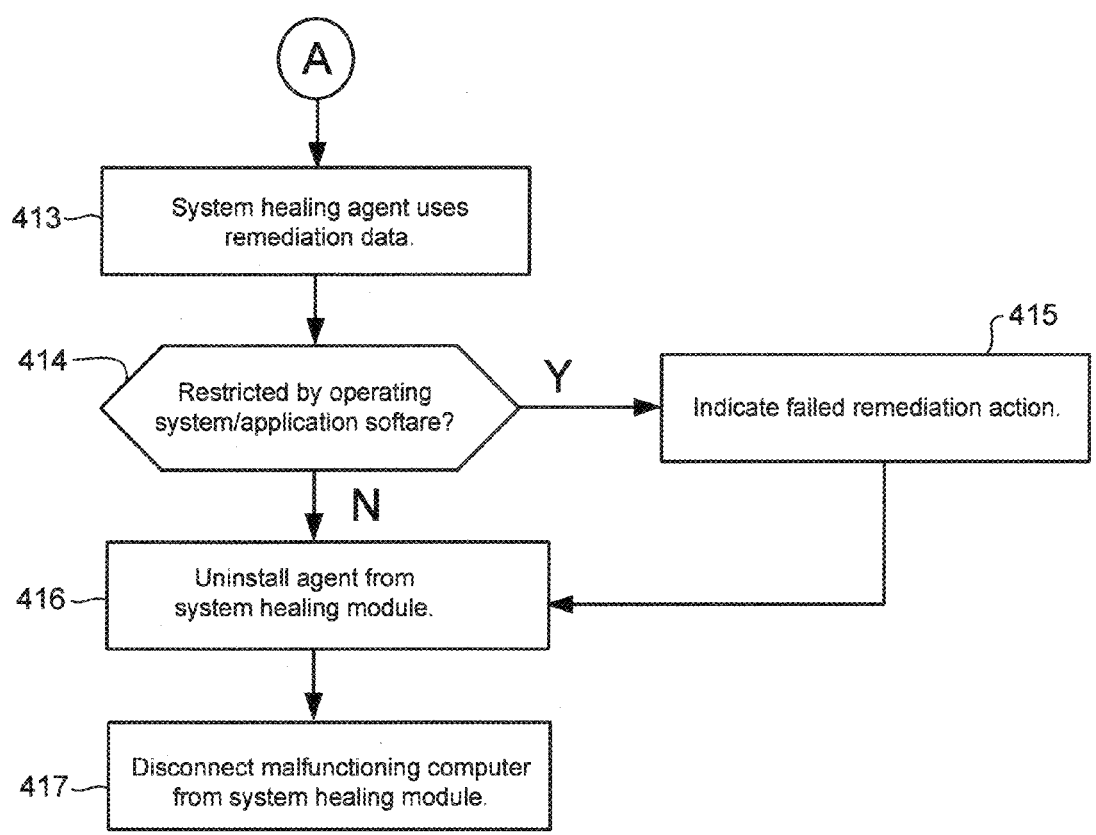

FIG. 4, which comprises FIGS. 4A and 4B, shows a flow diagram of a method of repairing a malfunctioning computer 202 in accordance with another embodiment of the present invention. In the method of FIG. 4, the system healing module 201 uses a system healing agent 208 to perform actions in a computer 302 being repaired, also referred to as "malfunctioning computer." The computer 202 is fully powered ON in the method of FIG. 4. For example, the computer 202 may be in the power state G0 of the ACPI specification.

In the method of FIG. 4, the malfunctioning computer 202 is connected to a port of a system healing module 201 (step 401). Depending on the operating system, credentials may have to be input to the computer 202 to allow for administrator-level actions, such as file installation, removal, etc. in the computer 202. For example, the user may log onto the malfunctioning computer 202 to enter an administrator password, etc. The user may also indicate to the system healing module 201 to fix a particular problem (e.g., identify a particular suspect software) or an unknown problem.

The system healing module 201 logs in and injects a system healing agent 208 into the computer 202 (step 403). The system healing agent 208 collects diagnostic data from the computer 202 (step 404). The system healing agent 208 may collect diagnostic data for particular software in the case where the user indicated particular suspect software, or generally in the case where the user is not sure which software is causing the problem. The diagnostic data may include file attributes of files in the data storage device of the computer 202. The diagnostic data collected by the system healing agent 208 may include file structure information, directory lists, file message digest (MD5, SHA1 or SHA256), file properties (e.g., digital signature, version, size), registry information, system service and daemon information, installed software, and system configurations. Software vendors may provide file information (e.g., how to identify their files, what diagnostic information the software vendors need) for their respective software products. The system healing agent 208 may use software vendor information to gather file attributes of files in the computer 202.

The system healing agent 208 provides the diagnostic data to the system healing module 201, which forwards the diagnostic data to the system healing harvester 203 (step 405). The system healing harvester 203, in turn, forwards the diagnostic data to the system healing master 205 (step 406). The system healing master 205 analyzes the diagnostic data to identify one or more support servers 204 responsible for fixing problems indicated in the diagnostic data. The system healing master 205 sorts the diagnostic data by support server 204 and forwards sorted diagnostic data to the responsible support servers 204 (step 407).

Each responsible support server 204 receives and analyzes diagnostic data to generate remediation data (step 408). The remediation data may comprise replacement files, scripts and procedures, and other data or information for fixing problems indicated in the diagnostic data. For example, the diagnostic data may indicate that the malfunctioning computer 202 includes a known defective version or incorrect version of a file (e.g., outlook.exe of Microsoft Office™ 2008 software). As another example, the diagnostic data may indicate that a critical file is corrupted based on its file attributes. In that case, the remediation data may include a replacement file. The remediation data may also include a script or procedure that the system healing agent 208 may execute in the computer 202.

The support server 204 forwards the remediation data to the system healing master 205, which collects and compiles remediation data received from support servers 204 (step 409). The system healing master 205 forwards the remediation data to the system healing harvester 203 that relayed the corresponding diagnostic data, which in turn forwards the remediation data to the system healing module 201 (step 410).

The system healing module 201 may receive appropriate antivirus from the system healing master 205 by way of the system healing harvester 203. As a precautionary measure, the system healing module 201 may use the antivirus to scan the computer 202 for malicious codes (e.g., computer viruses, spyware, robots) prior to using the remediation data to fix the computer 202 (step 411). The antivirus may run automatically upon installation by the system healing module 201 in the computer 202. The system healing module 201 thereafter deploys the remediation data in the computer 202 (step 412).

The system healing agent 208, which is running in the computer 202, employs the remediation data to fix problems in the computer 202 (FIG. 4B, step 413). For example, the system healing agent 208 may replace a file with the correct version of the file, install a new file (e.g., new virus definition or pattern file), and/or remove existing files (e.g., defective data or pattern files) in accordance with a script or other instructions included in the remediation data. The system healing agent 208 may also execute remediation actions on running software processes by remote inter-process communication (IPC) channels, and fix system resources (e.g., Windows™ operating system registry hive, services, and daemons). Additional files, replacement files, and procedures/instructions on how to perform remediation actions and fix system resources may be included in the remediation data.

In the event some files that need to be replaced, corrected, and/or deleted are protected by the operating system or application software, the system healing agent 208 may indicate the event by recording the event in a log or displaying a message on a screen (step 414 to 415) so that the user may be alerted to manually perform the file replacement, correction, and/or deletion at a later time. The system healing agent 208 is uninstalled from the computer 202 (step 416), and the computer 202 is thereafter disconnected from the system healing module 201 (step 417).

A support server 204 may analyze diagnostic data a variety of ways without detracting from the merits of the present invention. As an example, the support server 204 may include a file analyzer comprising computer-readable program code for comparing directory lists, file lists, message digest of file, and other file attributes against a file database. The following provides examples on how a support server 204 may address particular problems.

In a computer 202 running the Windows™ operating system, the windows\system32 folder stores the latest version of the most critical system files after multiple hot fixes and patches. The computer 202 may be in the power state G2 of the ACPI specification. Assuming the svchost.exe file is deleted for any reason, the support server 204 will detect the absence of svchost.exe based on the diagnostic data, and determine the correct version of svchost.exe file from collected patch management history. The support server 204 may then create remediation data having the following script:

```
Function 1( ) begin
Download http://remediation.ms.com/xpsp3/sys32/en/svchost.exe;
Save as \download\remediation\xpsp3\sys32\en\svchost.exe
Copy \download\remediation\xpsp3\sys32\en\svchost.exe to
    malfunctioning_computer\C:
    \Windows\System32\svchost.exe
Function end
```

The system healing module 201 executes the script to download a new svchost.exe file to its local storage, and uses the new svchost.exe file to replace the defective svchost.exe file in the computer 202.

In the same example, not only is the scvhost.exe file missing, but the computer 202 also has a bad virus definition file (e.g., a 594.dat file). The support server 204 of the antivirus vendor determines that the malfunctioning computer 202 has a bad 594.dat file, and in accordance with a pre-defined remediation plan upon finding a bad 594.dat file, generates remediation data having a script that deletes the 594.dat file, download a new 595.dat file, and copy the 595.dat file to the computer 202. The system healing master 205 may append this script to other scripts in the remediation data. An example of such amended script is:

```
Function 1( ) begin
Download http://remediation.ms.com/xpsp3/sys32/en/svchost.exe;
Save as \download\remediation\xpsp3\sys32\en\svchost.exe
Copy \download\remediation\xpsp3\sys32\en\svchost.exe to
    malfunctioning_computer\C:
    \Windows\System32\svchost.exe
Function end
Function 2( ) begin
Delete malfunctioning_computer\C:\Program
    Files\AntivirusRuby\594.dat
Download http://remediation.ay.com/avruby/595.dat
Save as \download\remediation\avruby\595.dat
Copy \download\remediation\avruby\595.dat to malfunctioning    computer\C:\Program
    Files\AntivirusRuby\595.dat
Function end
```

In the amended script immediately above, the Function 10 fixes the problem caused by the missing svchost.exe file, and the Function 20 fixes the problem associated with the bad 594.dat file. The system healing module 201 uses the script to download the necessary files to replace defectives ones in the computer 202.

In another example, the computer 202 also cannot properly execute a PDF (portable document format) reader. From the diagnostic data, the support server 204 of the PDF software vendor detects that the application registry for the PDF reader is missing. Using information from a resource database, the support server 204 may create the following script for execution by the system healing agent 208 running in the computer 202.

```
Function( ) begin
Create
    HKEY LOCAL
    MACHINE\SOFTWARE\Classes\pdf_Reader\shell\
    open\command="C:\Program Files\PDF Reader
    9.0\Reader\pdfreader.exe"/u "%1"
Function end
```

The system healing module 201 may also be employed for targeted remediation, i.e., fixing a particular problem. As an example, a user may call customer service of an antivirus vendor for a problem related to high CPU usage. The customer service may inform the user that he is experiencing a known problem related to a particular file, such as a 594.dat file or 5859.dat file employed by an antivirus program. While it is possible that the user knows how to perform file replacement and configuration, there is a chance the user is not comfortable performing the fix himself. In that case, the user may connect his malfunctioning computer 202 to a system healing module 201. The system healing module 201 may be configured to display a listing of known problems that it can readily fix. For example, in an embodiment where the system module 201 is a set-top box for cable television, the system module 201 may display on a TV screen a menu for selecting a particular problem to fix. Using his cable TV remote control, the user may select "594.DAT remediation," which enables the system module 201 to execute the following script to fix the problem.

```
Function( ) begin
Delete malfunctioning_computer\C:\Program
    Files\AntivirusRuby\594.dat
Download http://remediation.ay.com/avruby/595.dat
Save as \download\remediation\avruby\595.dat
Copy \download\remediation\avruby\595.dat to
    malfunctioning_computer\C:\Program
    Files\AntivirusRuby\595.dat
Function end
```

Methods and apparatus for diagnosing and repairing malfunctioning computers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer system comprising:
   a set-top box for cable television, the set top box being configured to collect diagnostic data from a malfunctioning computer connected to the set-top box, the set-top box being configured to receive remediation data for fixing the malfunctioning computer;
   a system harvester in communication with the set-top box over a high-speed connection, the system harvester comprising an apparatus configured to facilitate data transfer between the set-top box and a system healing master; and
   a system healing master comprising an apparatus configured to receive the diagnostic data from the system harvester and determine a support server providing the remediation data, the system healing master being configured to forward the diagnostic data to the support server, to receive the remediation data from the support server, and to forward the remediation data to the system healing harvester.

2. The computer system of claim 1 wherein the remediation data comprises a replacement file for a defective file in the malfunctioning computer.

3. The computer system of claim 1 wherein the remediation data comprises a new file that is missing from the malfunctioning computer.

4. The computer system of claim 1 wherein the remediation data comprises a script for deleting, replacing, or installing a file in the malfunctioning computer.

5. A method of repairing a computer, the method comprising:

a set-top box for cable television collecting diagnostic data from a computer connected to the set-top box, the diagnostic data including information about files in the computer;

a first server computer receiving the diagnostic data and forwarding the diagnostic data to a second server computer;

the first server computer receiving remediation data for fixing a problem indicated in the diagnostic data;

the set-top box receiving the remediation data; and the set-top box using the remediation data to fix the computer.

6. The method of claim 5 wherein the remediation data includes a script, and the set-top box installs the script in the computer so that the computer executes the script.

7. The method of claim 5 wherein the remediation data includes a replacement for a defective file in the computer.

8. The method of claim 5 wherein the remediation data includes a file that is missing in the computer.

9. The method of claim 5 wherein the set-top box injects an agent in the computer, the agent being configured to collect the diagnostic data.

10. The method of claim 5 wherein the agent is configured to fix the computer by implementing a remediation plan indicated in the remediation data.

11. The method of claim 5 wherein the first server computer comprises a multimedia server.

12. The method of claim 5 wherein the remediation data includes a script that deletes a file in the computer.

* * * * *